(12) United States Patent
Su et al.

(10) Patent No.: US 10,917,216 B2
(45) Date of Patent: Feb. 9, 2021

(54) METHOD OF TRANSMITTING CONFIGURATION INFORMATION, METHOD OF DETECTING CONTROL CHANNEL RESOURCES, AND DEVICES THEREFOR

(71) Applicant: Samsung Electronics Co., Ltd., Suwon-si (KR)

(72) Inventors: Di Su, Suwon-si (KR); Bin Yu, Suwon-si (KR); Chen Qian, Suwon-si (KR); Qi Xiong, Suwon-si (KR); Yingjie Zhang, Suwon-si (KR); Jingxing Fu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/481,420

(22) PCT Filed: Jan. 26, 2018

(86) PCT No.: PCT/KR2018/001165
§ 371 (c)(1),
(2) Date: Jul. 26, 2019

(87) PCT Pub. No.: WO2018/139892
PCT Pub. Date: Aug. 2, 2018

(65) Prior Publication Data
US 2020/0235885 A1 Jul. 23, 2020

(30) Foreign Application Priority Data

Jan. 26, 2017 (CN) .......................... 2017 1 0057383

(51) Int. Cl.
*H04L 5/00* (2006.01)
*H04L 1/00* (2006.01)
*H04W 72/04* (2009.01)

(52) U.S. Cl.
CPC .......... *H04L 5/0053* (2013.01); *H04L 1/0038* (2013.01); *H04L 5/0044* (2013.01);
(Continued)

(58) Field of Classification Search
CPC ... H04L 5/0053; H04L 5/0044; H04L 1/0038; H04L 5/0094; H04L 7/2121;
(Continued)

(56) References Cited

U.S. PATENT DOCUMENTS 10,652,856 B2 * 5/2020 Åstrom ............... H04L 27/2602
10,715,371 B2 * 7/2020 Si ........................ H04W 56/001
(Continued)

OTHER PUBLICATIONS

ISA/KR, International Search Report and Written Opinion of the International Searching Authority, International Application No. PCT/KR2018/001165, dated Apr. 30, 2018, 10 pages.
(Continued)

*Primary Examiner* — Sharad Rampuria (57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE).
The present invention relates to a method of transmitting configuration information, a method of detecting control channel resources, and devices therefor. The transmission method comprises: configuring, for each coreset, control channel resources on a time unit of a scheduling unit (SU); transmitting configuration for the resources of control channel on the time unit of the SU, wherein control channel resources belong to the coreset containing a plurality of continuous or discontinuous frequency-domain physical resource blocks available to transmit a downlink control channel. The detection method comprises: receiving configuration for the resources of control channel on a time unit of an SU; performing blind detection of a downlink control
(Continued)

channel for a user on the time unit of the SU according to the configuration information. The present invention can flexibly configure control channel resources and reduce blind detection of a control channel by a terminal, thereby attaining reduction of power consumption caused by blind detection of the control channel by the terminal and load equalization.

17 Claims, 7 Drawing Sheets

(52) U.S. Cl.
CPC ......... *H04L 5/0094* (2013.01); *H04W 72/042* (2013.01); *H04W 72/0446* (2013.01); *H04W 72/0453* (2013.01)

(58) Field of Classification Search
CPC ......... H04W 72/0446; H04W 72/0453; H04W 72/042; H04W 72/04; H04W 72/12; H04W 76/00; H04B 7/2123; H04J 2203/0069; H04Q 2213/394
See application file for complete search history.

(56) References Cited

U.S. PATENT DOCUMENTS

2018/0070341 A1* 3/2018 Islam .................. H04L 1/1887
2020/0221485 A1* 7/2020 Cirik .................. H04B 7/0695

OTHER PUBLICATIONS

ETRI, "Discussion on control resource set and DMRS for DL control channel," R1-1700581, 3GPP TSG RAN WG1 NR Ad-Hoc Meeting, Spokane, USA, Jan. 16-20, 2017, 5 pages.
Huawei, et al, "Design of control resource set," R1-1700014, 3GPP TSG RAN WG1 NR Ad Hoc Meeting, Spokane, USA, Jan. 16-20, 2017, 5 pages.
Intel Corporation, "Physical Downlink Control Channel Design for NR," R1-1700359, 3GPP TSG RAN WG1 NR Ad-Hoc Meeting, Spokane, USA, Jan. 16-20, 2017, 5 pages.
Mediatek Inc., "Design of NR-PDCCH resource allocation and search space," R1-1700150, 3GPP TSG RAN WG1 AH-NR Meeting, Spokane, USA, Jan. 16-20, 2017, 5 pages.
NTT Docomo, Inc., "Monitoring of DL control channel for NR," R1-1700620, 3GPP TSG RAN WG1 AH-NR Meeting, Spokane, USA, Jan. 16-20, 2017, 7 pages.

* cited by examiner

METHOD OF TRANSMITTING CONFIGURATION INFORMATION, METHOD OF DETECTING CONTROL CHANNEL RESOURCES, AND DEVICES THEREFOR

CROSS-REFERENCE TO RELATED APPLICATIONS

This application is a U.S. National Stage application under 35 U.S.C. § 371 of an International application number PCT/KR2018/001165, filed on Jan. 26, 2018, which is based on and claimed the priority of a Chinese patent application number 201710057383.X, filed on Jan. 26, 2017, in the Chinese Intellectual Property Office, the disclosure of which is incorporated by reference herein in its entirety.

BACKGROUND

1. Field

The present invention relates to a mobile communication system and, more particularly, to a method of transmitting configuration for the resources of control channel, a method of detecting control channel resources, a transmitting device, and a detecting device.

2. Description of Related Art

To meet the demand for wireless data traffic having increased since deployment of 4G (4$^{th}$-Generation) communication systems, efforts have been made to develop an improved 5G (5$^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Figure 1:
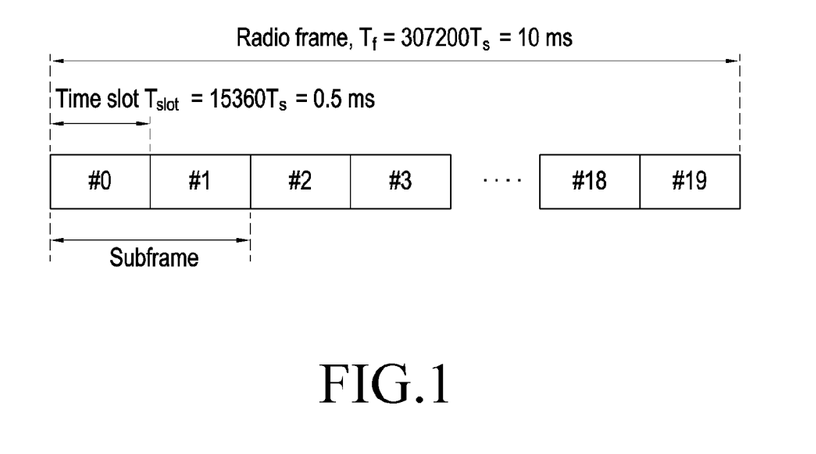
FIG. 1 is a schematic diagram of a frame structure of the existing LTE system.

In the 3GPP LTE system, each radio frame has the length of 10 ms and is divided into 10 subframes. A downlink transmission time interval (TTI) is defined on a subframe. FIG. 1 schematically shows a frame structure of an LTE system, wherein each downlink subframe includes two time slots; for the general cyclic prefix (CP) length, each time slot contains 7 orthogonal frequency division multiplexing (OFDM) symbols; for the extended CP length, each time slot contains 6 OFDM symbols.

Figure 2:
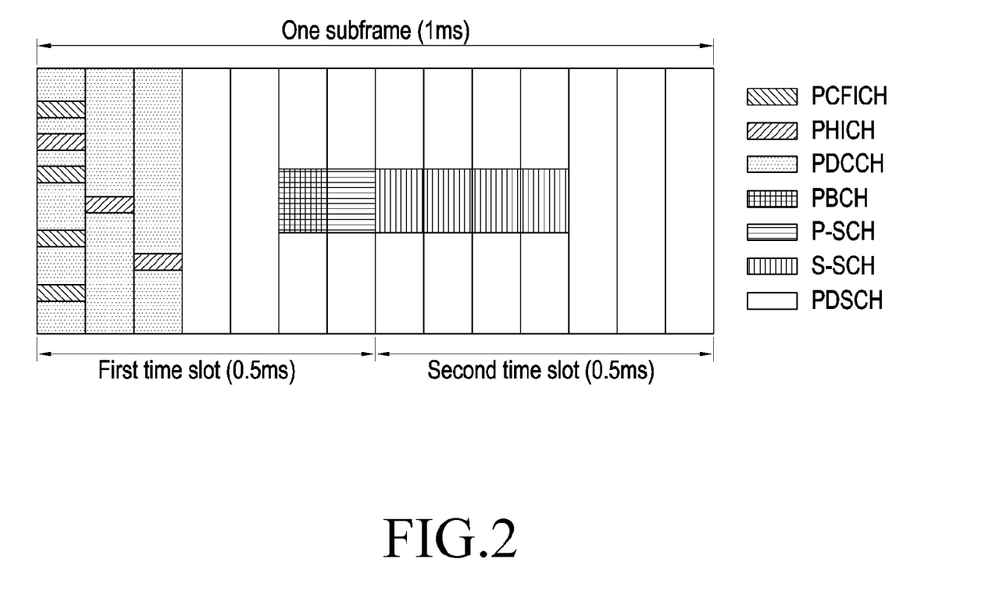
FIG. 2 is a schematic diagram of a mapping of physical channels of a downlink subframe of the existing LTE system.

The granularity of the frequency-domain resource allocation is a physical resource block (PRB), and one PRB is defined as 12 consecutive subcarriers in the frequency domain and one time slot in the time domain. One subframe contains two time slots, so there are two PRBs on the same subcarrier, defined as a pair of PRBs in LTE. FIG. 2 schematically shows mapping of physical channels of a downlink subframe of the LTE system. The LTE system uses the first 1~3 OFDM symbols of each downlink subframe in the time domain and all the subcarriers within the bandwidth in the frequency domain to transmit downlink control information, which can be regarded as the control channel region of the system. Within the control channel region, a physical control format indication channel (PCFICH) is first present which carries 2 bits of valid information to indicate the value of control format indicator (CFI), that is, indicating the number of OFDM symbols occupied by the control channel region. After receiving the downlink subframe data, a terminal first detects the PCFICH to obtain the value of the CFI and then detects the downlink control channel (PDCCH) within the control channel region indicated by the CFI.

The PCFICH can be transmitted on each downlink subframe or on a special subframe in TDD Frame structure type 2. The PCFICH carries 2 bits of CFI valid information. The CFI valid bits are spread encoded as 32 bits according to Table 1, and then are QPSK modulated to be mapped in 4 resource element groups (REGs), 16 resource elements (REs) in total.

TABLE 1

| CFI | CFI code word <$b_0, b_1, \ldots, b_{31}$> |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The PCFICH is mapped onto the full bandwidth of the first OFDM symbol of the Downlink Pilot Time Slot (DwPTS) in the downlink subframe or the special subframe. In order to obtain the frequency-domain diversity gain, the occupied 4 Resource Element Groups (REG)s will be discretely mapped onto the first OFDM symbol. The mapping formula specified in the protocol is as follows:

$Z^{(p)}(0)$ index of mapped REG is $k=\bar{k}$ $Z^{(p)}(1)$ index of mapped REG is $k= \bar{k}+\lfloor N_{RB}^{DL}/2 \rfloor \cdot N_{sc}^{RB}/2$ $Z^{(p)}(2)$ index of mapped REG is $k= \bar{k}+\lfloor 2N_{RB}^{DL}/2 \rfloor \cdot N_{sc}^{RB}/2$ $Z^{(p)}(3)$ index of mapped REG is $k= \bar{k}+\lfloor 3N_{RB}^{DL}/2 \rfloor \cdot N_{sc}^{RB}/2$ where $Z^{(p)}(i)$ represents the $i^{th}$ REG occupied by the PCFICH upon being mapped at the $p^{th}$ antenna port, and $\bar{k}=(N_{sc}^{RB}/2) \cdot (N_{ID}^{cell} \mod 2N_{RB}^{DL})$ represents the initial position, where the PCFICH is mapped, and is determined by both the cell identifier $N_{ID}^{cell}$ and the cell downlink bandwidth $N_{RB}^{DL}$. The 4 REGs are discretely mapped, at the same interval, in the full bandwidth of the first OFDM symbol in the downlink subframe.

The next generation 5G communication system will use greater bandwidth resources on a higher frequency band, and then the system bandwidth will be far larger than the current maximum bandwidth of 20 MHz for LTE. Meanwhile, the system will also be required to serve users of different bandwidth capabilities at the same time, that is, the transmission and reception bandwidths of different users are different, and the minimum user bandwidth capability will be far less than the system bandwidth. In this case, if the LTE design is reused to define a control channel on the whole bandwidth, a user with less bandwidth capability will fail to normally receive a downlink control channel. During the current 3GPP 5G standard development discussion, the concept of a coreset has been introduced, one coreset containing a plurality of continuous or discontinuous PRBs for transmitting a downlink control channel. The system can configure multiple coresets as requirement. It is also specified that the allocated resource unit for the control channel is PRB, so the downlink control channel for a user occupies resource position of an integer number of PRBs in the frequency-domain.

SUMMARY

The 5G communication system differs essentially from LTE in definition for control channel resources, and will support more flexible way for control channel resources. New problems different from the LTE system arise, such as how to notify a terminal and what criteria to be adopted for adjustment of control channel resource configuration. Presently no solutions of these problems can be reused.

The present invention provides a method of transmitting configuration for the resources of control channel, a method of detecting control channel resources, a transmitting device, and a detecting device, which can flexibly configure control channel resources and reduce blind detection of a control channel by a terminal.

According to the first aspect of the present invention, a method of transmitting configuration for the resources of control channel is provided, the method comprising the following steps: configuring, for each coreset, control channel resources on a time unit of a scheduling unit (SU); and transmitting configuration for the resources of control channel on the time unit of the SU, wherein the control channel resources belong to the coreset containing a plurality of continuous or discontinuous frequency-domain physical resource blocks available to transmit a downlink control channel.

According to the second aspect of the present invention, a method of detecting control channel resources is provided, the method comprising the following steps: receiving configuration for the resources of control channel on a time unit of an SU; performing blind detection of a downlink control channel for a user on the time unit of the SU according to the configuration information, wherein the control channel resources belong to a coreset containing a plurality of continuous or discontinuous frequency-domain physical resource blocks available to transmit a downlink control channel.

According to the third aspect of the present invention, a transmitting device for transmitting configuration for the resources of control channel is provided, the transmitting device comprising: a configuring unit for configuring, for each coreset, control channel resources on a time unit of an SU; a transmitting unit for transmitting configuration for the resources of control channel on the time unit of the SU, wherein the control channel resources belong to the coreset containing a plurality of continuous or discontinuous frequency-domain physical resource blocks available to transmit a downlink control channel.

According to the fourth aspect of the present invention, a detecting device for detecting control channel resources is provided, the detecting device comprising: a receiving unit for receiving configuration for the resources of control channel on a time unit of a scheduling unit (SU); a detecting unit for performing blind detection of a downlink control channel for a user on the time unit of the SU according to the configuration information, wherein the control channel resources belong to a coreset containing a plurality of continuous or discontinuous frequency-domain physical resource blocks available to transmit a downlink control channel.

In the present invention, on the base station side, control channel resources on a time unit of an SU is configured for each coreset, and configuration for the resources of control channel on the time unit of the SU is transmitted, wherein the control channel resources belong to the coreset containing a plurality of continuous or discontinuous frequency-domain physical resource blocks available to transmit a downlink control channel; on the terminal side, configuration for the resources of control channel on a time unit of an SU is received, and blind detection of a downlink control channel for a user is performed on the time unit of the SU according to the configuration information.

The present invention configures control channel resources on a time unit, thereby flexible configuration on the control channel resources is achieved, and performs blind detection of a downlink control channel for a user on the time unit according to the configuration information, thereby reducing blind detection of a control channel by a terminal, and attaining reduction of power consumption caused by blind detection of the control channel by the terminal and load balance.

BRIEF DESCRIPTION OF THE DRAWINGS

To describe the technical solutions of the present invention more clearly, drawings to be used for description of the present invention will be briefly introduced below. Apparently, the drawings to be described below show merely some embodiments of the present invention. Other drawings and embodiments can be obtained according to the disclosure of the present invention and these drawings by a person of ordinary skill in the art without any inventive effort.

DETAILED DESCRIPTION

In order to make the technical problem solved by the present invention, the adopted technical solutions and the attained technical effect clearer, the technical solutions of the present invention will be described in detail with reference to FIGS. 1 to 10. Apparently, the described embodiments are not all but merely part of the embodiments of the present invention. All other embodiments obtained on the basis of the described embodiments of the present invention, by those skilled in the art without any inventive effort, are within the scope of the present invention.

Figure 3:
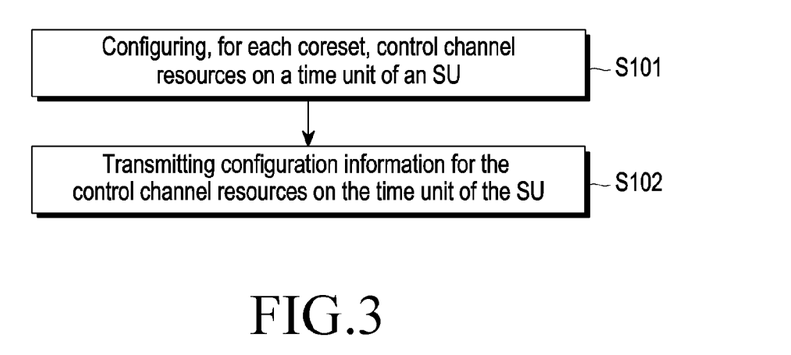
FIG. 3 is a flowchart of a method of transmitting configuration for the resources of control channel according to the present invention.

FIG. 3 is a flowchart of a method of transmitting configuration for the resources of control channel according to the present invention which is applied to the base station side. The present invention is applicable to the 5G communication system and to other communication systems involving configuration of control channel resources on a time unit of a scheduling unit (SU).

Step S101: configuring, for each coreset, control channel resources on a time unit of an SU, wherein the control channel resources belong to the coreset containing a plurality of continuous or discontinuous frequency-domain physical resource blocks (PRBs) available to transmit a downlink control channel.

The time unit is a downlink time slot, a downlink subframe, a downlink mini time slot, or other specified form.

Step S102: transmitting configuration for the resources of control channel on the time unit of the SU.

The configuration information comprises time-domain and/or frequency-domain configuration information. Compared with LTE configuration method, the present solution can only configure time-domain resources, only frequency-domain resources, or time-domain and frequency-domain resources, thereby realizing flexible configuration of control channel resources.

The present technical solution provides three ways: a dynamic way, a semi-static way, and a semi-static and dynamic hybrid way. According to the different ways, the following three embodiments are provided.

As the first embodiment, control channel resources on a time unit of a current SU is configured in a dynamic way; configuration for the resources of control channel on the time unit of the SU is transmitted on the time unit of the current SU.

As the second embodiment, control channel resources on time units of SUs during a configuration period are configured in a semi-static way; configuration for the resources of control channels on the time units of the SUs during the configuration period is transmitted through system information, wherein the configuration period contains time units of one or more SUs.

The configuration period is explicitly notified in the system information or/and the default configuration fixedly has a default value based on a scheduling period of the system information.

As the third embodiment, one part of configuration parameters for control channel resources on time units of SUs during a configuration period are configured in a semi-static way, and other part of configuration parameters for control channel resources on a time unit of a current SU are configured in a dynamic way; configuration information carrying the one part of configuration parameters for the control channel resources on the time units of the SUs during the configuration period is transmitted through system information, and configuration information carrying the other part of configuration parameters for the control channel resources on the time unit of the SU is transmitted on the time unit of the current SU, wherein the configuration period contains time units of one or more SUs, and the one part of configuration parameters are different from the other part of configuration parameters.

In the dynamic way, control channel resources on each time unit is individually configured; accordingly, configuration information is transmitted on each time unit. In the semi-static way, control channel resources on time units of several SUs during a predetermined time are configured for one time; accordingly, configuration information is transmitted through system information. In the semi-static and dynamic hybrid way, one part of configuration parameters for control channel resources on time units of several SUs during a predetermined time are configured for one time, and other part of configuration parameters for control channel resources on each time unit are individually configured; accordingly, configuration information carrying the one part of configuration parameters for the control channel resources is transmitted through system information, and configuration information carrying the other part of configuration parameters for the control channel resources is transmitted on each time unit.

For the third embodiment, the one part of configuration parameters and the other part of configuration parameters comprise the following three cases.

In the first case, the one part of configuration parameters configured in a semi-static way are cell-specific frequency-domain resource configuration parameters, and the other part of configuration parameters configured in a dynamic way are cell-specific time-domain resource configuration parameters.

In the second case, the one part of configuration parameters configured in a semi-static way are cell-specific time-domain resource configuration parameters, and the other part of configuration parameters configured in a dynamic way are cell-specific frequency-domain resource configuration parameters.

In the third case, the one part of configuration parameters configured in a semi-static way are configuration parameters for the resource of the control channel carrying common control signaling, and the other part of configuration parameters configured in a dynamic way are configuration parameters for the resource of the control channel carrying user-specific control signaling.

In addition to the above three cases, in the semi-static and dynamic hybrid way, the one part of configuration parameters and the other part of configuration parameters can also be parameters for the control channel resources divided in other manners.

For the first embodiment and the third embodiment, a physical channel on the time unit of the current SU carries a control channel format index, the control channel format index indicating configuration for the resources of control channel on the time unit of the current SU. The control channel format index is an index representing a resource available for the control channel.

Wherein, the control channel format index can be obtained according to the network load condition and the user scheduling condition; or the control channel format index is obtained according to the network load condition, the previous downlink time slot and the current downlink time slot.

For the second embodiment and the third embodiment, the system information carries a control channel format index indicating configuration for the resources of control channels on the time units of several SUs during the configuration period.

Wherein the system information comprises the master information block and/or the system information block.

In implementation of the present technical solution, multiple coresets are configured in the system; the step of configuring, for each coreset, control channel resources on a time unit of an SU can comprise: configuring control channel resources on a time unit of an SU individually for each coreset. The multiple coresets are two or more (such as 2, 3, 6, 9 and so on) coresets.

The present technical solution further comprises a step of transmitting, via collision resolution message MSG4, a user-specific signaling indicating the resource of the control channel carrying the user-specific control signaling. After employing this step, power consumption caused by user meaningless blind detection can be reduced. This step is performed before a terminal detects the time unit.

The present technical solution further comprises: determining that a part or all of the resources in the coreset are not configured to a control channel, the part or all of the resources being used to schedule traffic channels.

Figure 4:
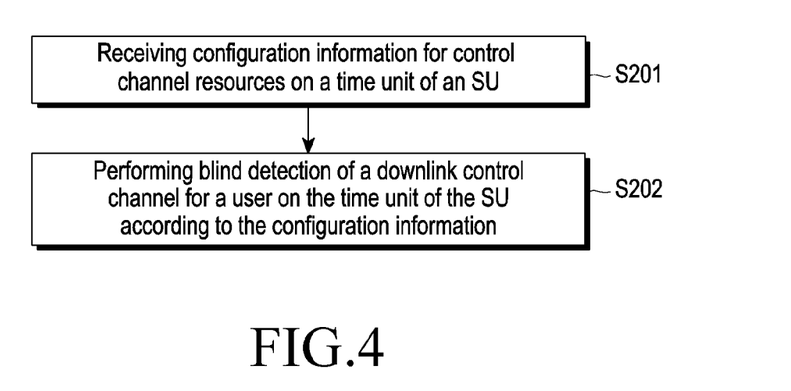
FIG. 4 is a flowchart of a method of detecting control channel resources according to the present invention.

FIG. 4 is a flowchart of a method of detecting control channel resources according to the present invention, which can be applied to the terminal side.

Step S201: receiving configuration for the resources of control channel on a time unit of an SU, wherein the control channel resources belong to a coreset containing a plurality of continuous or discontinuous frequency-domain physical resource blocks available to transmit a downlink control channel.

The time unit is a downlink time slot, a downlink subframe, a downlink mini time slot, or other specified form.

According to the different ways of the base station, the step of the terminal receiving configuration for the resources of control channel on a time unit of an SU comprises the following three embodiments.

As the first embodiment, in the case that the base station configures control channel resources in a dynamic way, the terminal receives the configuration information, for the control channel resources on the time unit of the SU, which is transmitted on the time unit of the current SU.

As the second embodiment, in the case that the base station configures control channel resources in a semi-static way, the terminal receives the configuration information, for the control channel resources on the time units of the SUs during the configuration period, which is transmitted through system information, wherein the configuration period contains time units of one or more SUs.

As the third embodiment, in the case that the base station configures control channel resources in a semi-static and dynamic hybrid way, the terminal receives the configuration information, carrying one part of configuration parameters for the control channel resources on the time units of the SUs during the configuration period, which is transmitted through system information, and receives the configuration information, carrying other part of configuration parameters for the control channel resources on the time unit of the SU, which is transmitted on the time unit of the current SU, wherein the configuration period contains time units of one or more SUs.

Step S202: performing blind detection of a downlink control channel for a user on the time unit of the SU according to the configuration information.

As an embodiment, the step S201 and S202 comprises: deciding, according to the configuration information, whether or not the control channel resources on the time unit of the SU can transmit a downlink control channel for the present user; if yes, performing blind detection of the downlink control channel on the time unit; if no, not performing detection of the downlink control channel on the time unit.

More specifically, deciding, according to the configuration information, whether or not the control channel resources on the time unit of the SU has control channel mapping; if no, not performing detection of the downlink control channel on the time unit; if yes, finding the control channel resources on the time unit according to the configuration information, and deciding, according to the configuration information and self-search space definition, whether or not the control channel resources on the time unit of the SU can transmit a downlink control channel for the present user: if yes, performing blind detection of the downlink control channel on the time unit; if no, not performing detection of the downlink control channel on the time unit.

The solutions of configuring control channel resources in a dynamic way, in a semi-static way, in a semi-static and dynamic hybrid way, and the solution of notifying the control channel resources by user-specific signaling are described below, respectively.

Embodiment 1

The present embodiment provides a solution of dynamically configuring control channel resources.

The base station can dynamically configure the control channel resources as requirement, and use, at the time-domain position where each downlink control channel is possibly present, a physical channel with the fixed time-frequency resource position to indicate the size of a resource available for the control channel, i.e., indicating the configuration information. For example, a control channel format indicator channel (CFICH) similar to that in LTE is defined. Taking into account that the resource available for the control channel consists of time-frequency resources specified by one or more coresets and that the different coresets is possible to have the different size and appearing period of the time-frequency resource, a CFICH should be defined for each coreset. When the terminal user needs to receive a control channel at a resource position specified by a certain coreset, it is necessary to first detect a CFICH in the bandwidth of the coreset to obtain the position of the time-frequency resource, available for the control channel, in the coreset, i.e., obtaining the configuration information.

CFICH is the physical channel indicating the configuration information, and CFI is the control channel format index, i.e., an index representing the resource available for the control channel. The time unit of the SU can comprise a downlink subframe, a downlink time slot, a mini time slot and the like. In the following description, a time slot is taken for example, that is, in this case each downlink time slot can possibly transmit a downlink control channel indicating the scheduling information.

The resource available for the control channel mapping is indicated by the CFICH, wherein information that can be indicated includes the time-domain or/and frequency-domain resource available for the control channel mapping at the current time slot or during a period of time; or indicating the default control channel resources in a default manner and the like. For example, CFICH indicates the number of OFDM symbols and the frequency-domain physical resource blocks (PRBs) available for the control channel mapping at the current time slot, which are defined by the control channel format CFI. Table 2 below gives an example assuming that the CFI with a value of 7 indicates that the control channel resources comprise all the time-frequency resources of the coreset.

TABLE 2

| CFI | Time-domain resource | Frequency-domain resource |
|-----|----------------------|---------------------------|
| 0 | No control channel (0 symbol) | No control channel |
| 1 | First 1 OFDM symbol | All PRBs of coreset |
| 2 | First 1 OFDM symbol | First ½ of PRBs of coreset |
| 3 | First 1 OFDM symbol | First ⅔ of PRBs of coreset |
| 4 | First 2 OFDM symbols | All PRBs of coreset |
| 5 | First 2 OFDM symbols | First ½ of PRBs of coreset |
| 6 | First 2 OFDM symbols | First ⅔ of PRBs of coreset |
| 7 | First 3 OFDM symbols | All PRBs of coreset |

In the case of indicating the resource available for the control channel mapping by the CFICH, it is also possible to first fix the time-domain (or frequency-domain) resource of the control channel, i.e., having no need to indicate this part of the resource, and only indicate the frequency-domain (or time-domain) control channel resources by the CFICH. For example, the time-domain resource of the control channel is fixed at the first symbol of each time slot, and the frequency-domain resource of the control channel is indicated by the CFI, as illustrated in Table 3 below; or the frequency-domain resource of the control channel is fixed to occupy a fixed number of PRBs within the system bandwidth, and the time-domain resource of the control channel is indicated by the CFI, as illustrated in Table 4 below.

TABLE 3

| CFI | Frequency-domain resource |
|-----|---------------------------|
| 0 | No control channel |
| 1 | All PRBs of coreset |
| 2 | First ½ of PRBs of coreset |
| 3 | First ⅔ of PRBs of coreset |

TABLE 4

| CFI | Time-domain resource |
|-----|----------------------|
| 0 | No control channel |
| 1 | 1st OFDM symbol of each time slot |
| 2 | First 2 OFDM symbols of each time slot |
| 3 | First 3 OFDM symbols of each time slot |

The user needs to detect the CFI information carried by the CFICH and obtain, according to the CFI at each downlink time slot, the resource available for the control channel mapping at the current time slot in a look-up table manner. For a downlink time slot in a default CFICH, the user can obtain, according to a certain system rule, CFI information for the current time slot, for example, in this case use of all the time-frequency resources specified in the coreset by default, wherein the time-frequency resources of the coreset can be notified through common or specific signaling or take default fixed values; or CFI indicated by the most recent CFICH can be used as the CFI for the current time slot.

The base station can configure the specific value of the CFI according to the control channel load condition of the network and the user scheduling condition. For example, when connections to the network by mass users cause heavy control channel load, the base station can configure all the time-frequency resources of the coreset to be used for control channel transmission, as the example for the CFI with a value of 7 in Table 2; when the control channel load in the network is light, the base station can configure part or all of the coreset to be multiplexed for data transmission, thereby significantly improving the system spectral efficiency, as the example for the CFI with a value of 0~6 in Table 2. In the specific solution, the base station can determine the CFI value for the current time slot according to the network load condition and the scheduling condition of the preorder time slot and the current time slot. For example, cross time slot scheduling is performed at the preorder time slot and the data transmission occupies the current time slot (or the base station schedules a downlink user at the current time slot, or there is a semi-persistent scheduled user at the current time slot), the PRBs used for data transmission partially or completely overlap with the coreset, while the base station schedules no user or schedules few users at the current time slot, that is, it is not necessary to transmit the downlink control channels or few downlink control channels. Under the premise of satisfying use of the control channel resources, the base station can configure the CFI value so that the resources of the coreset are multiplexed for data transmission as much as possible to improve the spectral efficiency of the data transmission. In addition, on the coreset carrying common control signaling transmission, the base station also needs to determine, according to the current network load condition, the size of control channel resources reserved for the common control signaling transmission.

There is a case allowed where no control channel mapping for the current time slot is indicated, for example, the case where CFI is 0 in Table 2. If no control channel mapping for the current time slot is indicated, the base station can multiplex all the time-frequency resources (except the reference signal and the CFICH) of the coreset at the downlink time slot for downlink data transmission, for example, cross time slot data transmission for the user scheduled at the previous time slot, or data transmission for the semi-persistent scheduled user. For a user who receives downlink data transmission at the time slot, when it is confirmed, by reading the CFICH, that the current time slot has no control channel mapping, it is necessary to detect traffic data on all the time-frequency resources (except the reference signal and the CFICH) in the coreset; for a user who detects the control channel at the time slot, it is also necessary to read the CFICH and, if it is confirmed that the current time slot has no control channel mapping, the user can no longer perform blind detection of the downlink control channel at the current time slot. Similarly, other CFIs can also configure a part of the time-frequency resources of the coreset for data channel transmission. A user monitoring the downlink control channel can determine, according to the resource indicated by the CFI and self-search space definition, whether or not the base station can transmit its own control channel at the current time slot. If the condition for transmitting the control channel is not met (for example, the range of the search space for the control channel exceeds the range of available resources indicated by the CFI), the user can no longer perform blind detection of the downlink control channel. Taking the CFI content in Table 2 as example, FIG. 5 shows a flowchart that a base station transmits multi-user control channels based on CFI configuration, and FIG. 6 shows a flowchart that a user detects the present user control channel based on CFI configuration.

Figure 5:
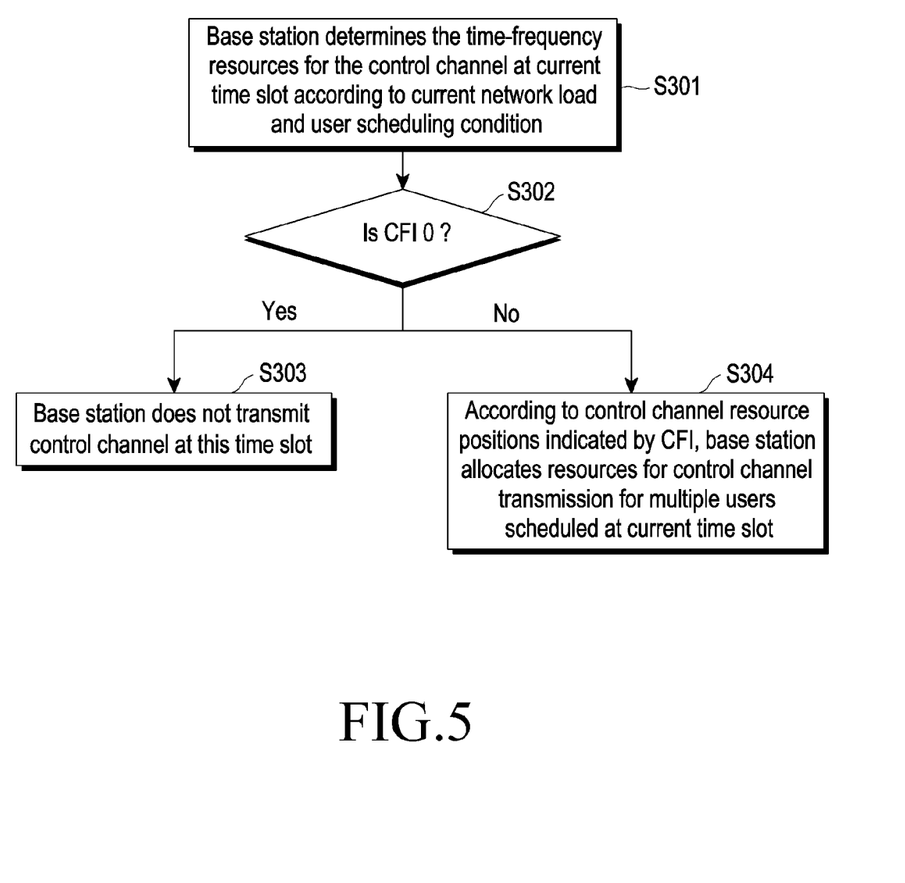
FIG. 5 is a flowchart that a base station transmits multi-user control channels based on CFI configuration, according to the present invention.
Figure 6:
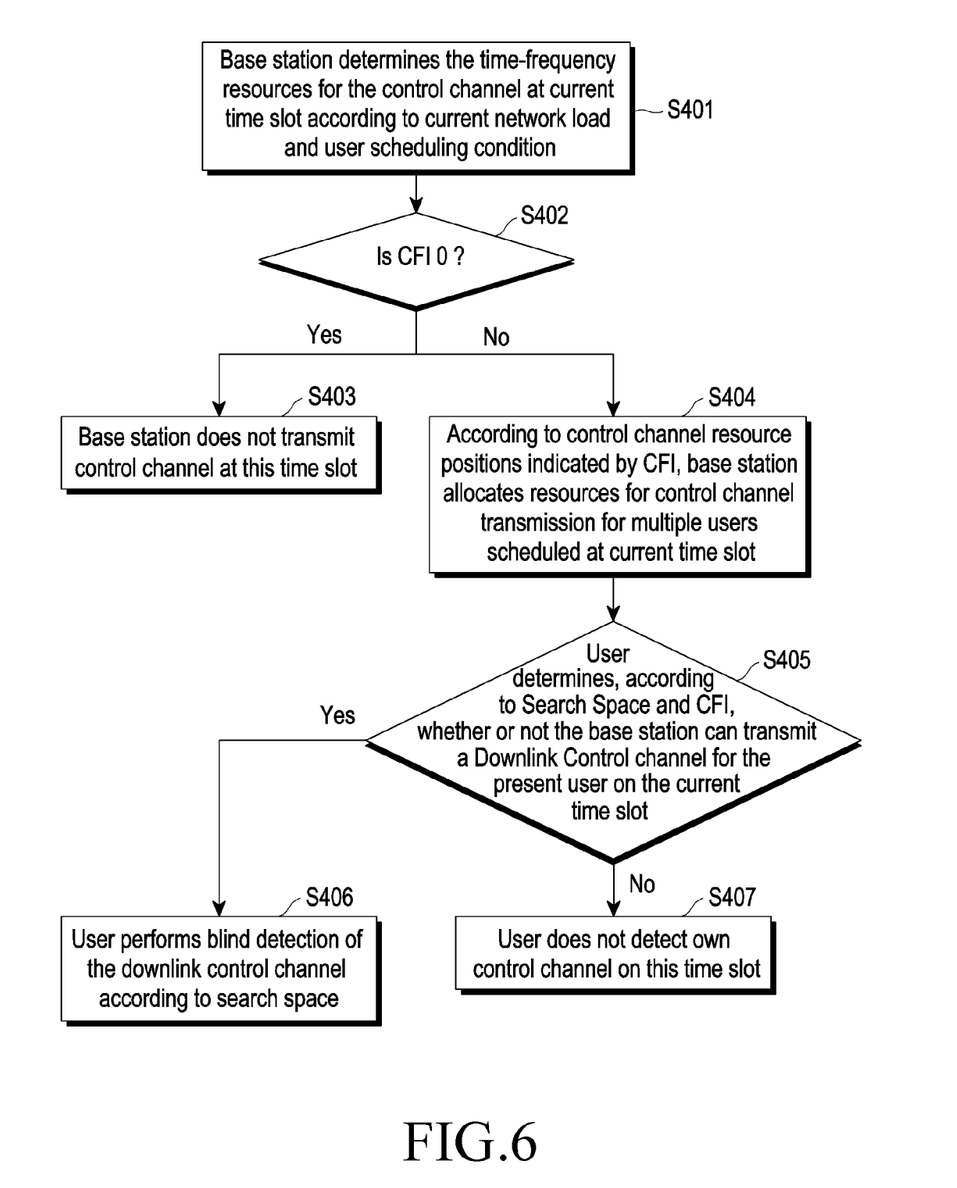
FIG. 6 is a flowchart that a terminal detects the present user control channel based on CFI configuration, according to the present invention.

FIG. 5 is a flowchart that a base station transmits multi-user control channels based on CFI configuration, according to the present invention.

In step S301, the base station determines the time-frequency resources for the control channel at the current time slot according to the current network load and the user scheduling condition.

In step S302, the base station determines whether CFI is 0.

In step S303, if the CFI is 0, the base station does not transmit the control channel at the current time slot.

In step S304, if the CFI is not 0, the base station allocates the time-frequency resources for control channel transmission for multiple users scheduled at the current time slot according to control channel resource positions indicated by the CFI.

FIG. 6 is a flowchart that a terminal detects the present user control channel based on CFI configuration, according to the present invention.

In step S401, the base station determines the time-frequency resources for the control channel at the current time slot according to the current network load and the user scheduling condition.

In step S402, the base station determines whether CFI is 0.

In step S403, if the CFI is 0, the base station does not transmit the control channel at the current time slot.

In step S404, if the CFI is not 0, the base station allocates the time-frequency resources for control channel transmission for multiple users scheduled at the current time slot according to control channel resource positions indicated by the CFI.

In step S405, a user (i.e., the user's terminal) determines, according to the search space and the CFI, whether or not the base station can transmit a downlink control channel at the current time slot.

In step S406, if the base station can transmit the downlink control channel, the terminal performs blind detection of the downlink control channel according to the search space.

In step S407, if the base station cannot transmit the downlink control channel, the terminal does not detect own control channel on the current time slot.

Figure 7:
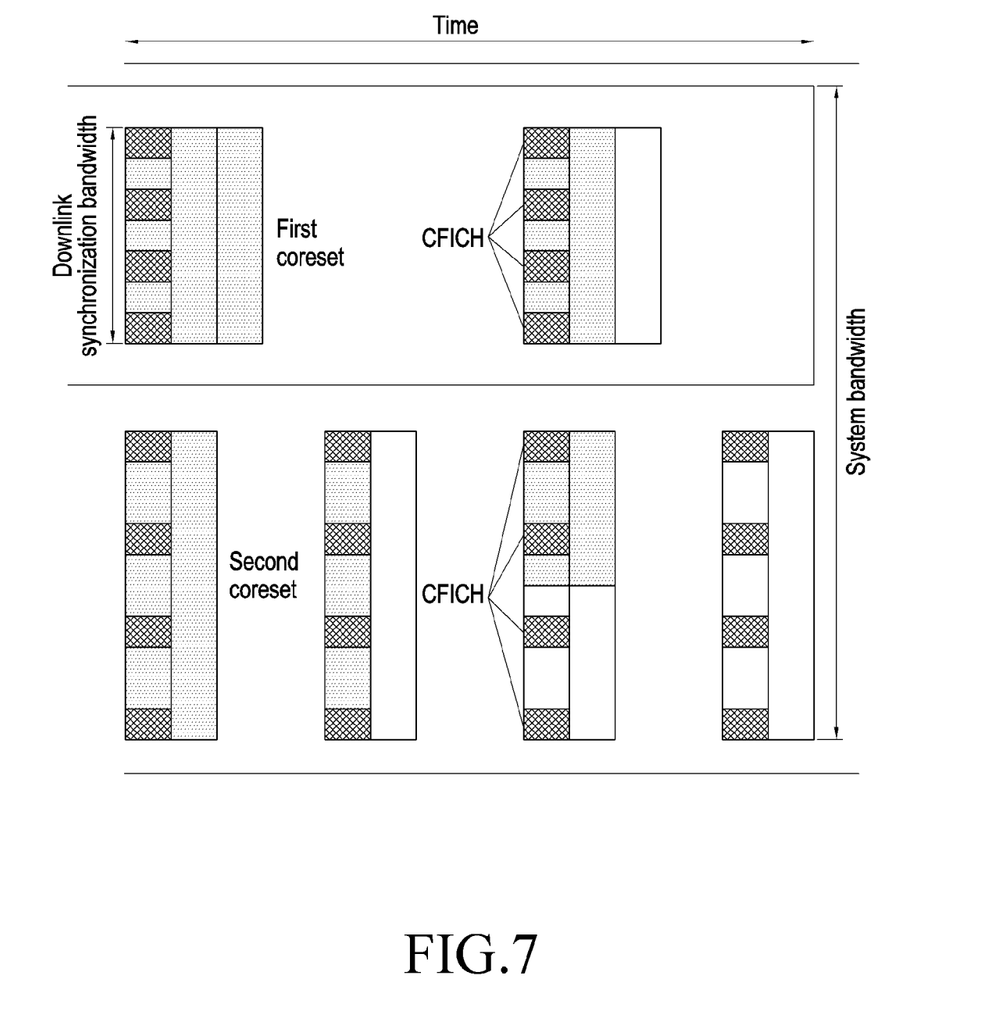
FIG. 7 is schematic diagram of a CFICH mapping according to the present invention.

The mapping of the CFICH on the bandwidth of each coreset can reuse the basic idea of LTE and is continuously or discretely distributed in units of resource groups within the bandwidth range of the coreset. Similarly to LTE, a resource group can be defined as consisting of a fixed number of resource elements (RE), or consisting of a fixed number of frequency-domain PRBs. At this time, in view of possible presence of a reference signal and other channels, different resource groups are possible to contain different valid resource elements. The mapping of the CFICH in the time-domain can occupy one or more OFDM symbols. Occupancy of only the first symbol can help the user to quickly obtain CFI information, while occupancy of multiple symbols can result in higher time-domain diversity gain, improving reliability of CFICH transmission. The number of OFDM symbols occupied by the CFICH mapping needs to be fixed or specified by system information such as MIB/SIB. For example, if CFICH is divided into 4 resource element groups and discretely mapping on the first OFDM symbol, FIG. 7 shows a schematic diagram of the CFICH mapping.

Embodiment 2

The present embodiment provides a solution of semi-statically configuring control channel resources.

The base station can semi-statically configure the coreset according to certain criteria, and indicate, through system information, the size of the resource used for the base station to transmit the control channel, i.e., indicating the configuration information. The configuration for the resources of control channel can be carried and transmitted in the master information block (MIB), the system information block (SIB), and the like. For example, relevant signaling message can be added to the MIB for indicating the size of the time-domain/frequency-domain/time-frequency resource available for the control channel during a period of time, and the signaling message can use the CFI in Embodiment 1 as a specific message type and accomplish notification by the base station transmitting a broadcast channel; such a signaling message can also be add to the SIB and, after transmitting the MIB message, the base station schedules, by transmitting the common control signaling, the traffic channel for transmitting the SIB; or, a hybrid manner can be adopted, wherein specific signaling of the control channel available resource configuration is transmitted in the SIB while several fields in the MIB are used to indicate the update domain for the SIB, including but not limited to signaling updates for the control channel available resource configuration. This design allows the user to purposefully read the SIB based on information indicated by the MIB, reducing the delay and power consumption for the terminal to acquire the control channel resource configuration.

Figure 8:
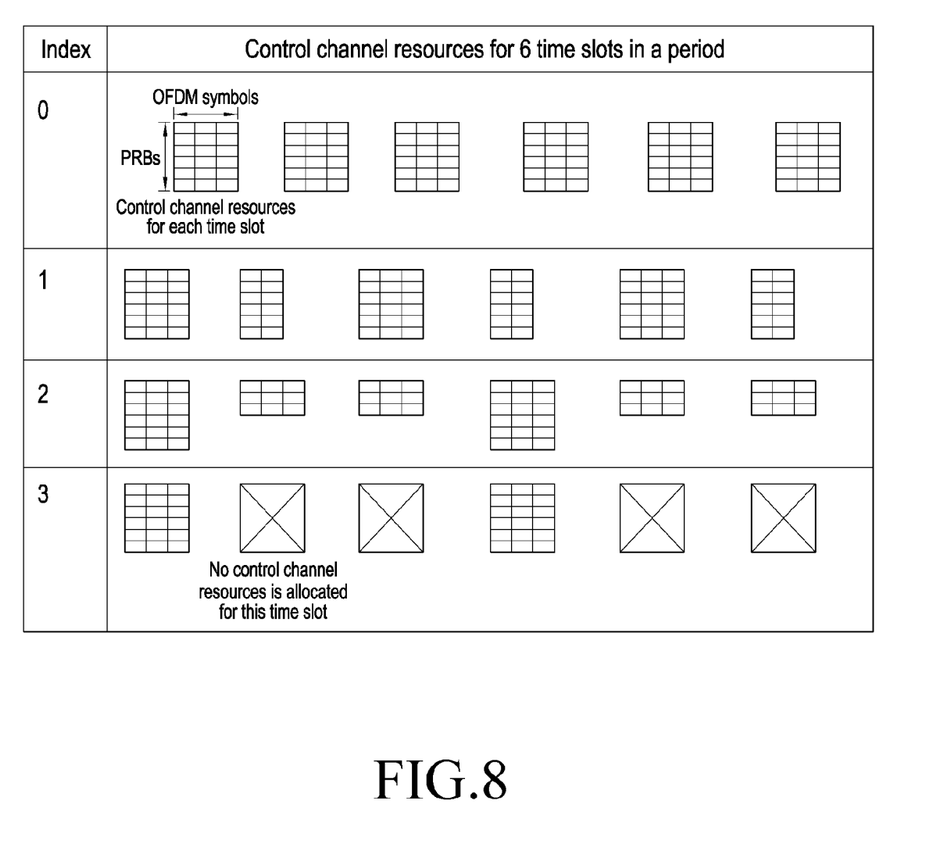
FIG. 8 is an exemplary diagram of determining control channel resources for multiple time slots based on a look-up table, according to the present invention.

The configuration for the control channel resource through the system information is semi-static, and is valid at least during the scheduling period of the system information. For example, the system information notifies an indicator message (such as CFI in Embodiment 1) for the control channel available resource at a single time slot, and defaults to use of the same control channel resource configuration for all downlink time slots during a period; the system information can also configure use of different control channel resource configurations for multiple downlink time slots during a period, which can be notified in a look-up table mapping manner. The period can be explicitly notified in the system information or/and the default configuration fixedly has a default value based on the scheduling period of the system information. Assuming that the configured period contains 6 downlink time slots, FIG. 8 is an exemplary diagram of determining control channel resources for multiple time slots based on a look-up table.

Embodiment 3

The present embodiment provides a solution of configuring control channel resources in a semi-static and dynamic hybrid way.

In addition to the dynamic configuration or semi-static configuration solution in Embodiment 1 and Embodiment 2, the semi-static and dynamic hybrid way can be employed. The base station can semi-statically configure one part of the control channel resources according to certain criteria, and the remaining configuration information is indicated dynamically. Compared with the semi-static way, the hybrid way can be more flexible to indicate the control channel resources, so that the base station can quickly adjust the control channel resources according to the current network condition. Compared with the dynamic way, the hybrid way can have less signaling overhead; or, under the premise of the same signaling overhead, the control channel resources can be configured in finer granularity. The manner of carrying and transmitting the configuration information in the hybrid way is as described in Embodiment 1 and Embodiment 2.

The way for the configuration for the resources of control channel can be divided according to certain criteria, that is, employing semi-static configuration or dynamic configuration. For example, the configuration for the resources, used by the control channel, of the coreset used to transmit common control signaling employs the semi-static way, i.e., indicated by the system information, as described in Embodiment 2; the configuration for the resources, used by the control channel, of the coreset used to only transmit user-specific control signaling employs the dynamic way, as described in Embodiment 1. With this design, the resources for transmission of common control signaling can have maximum degree of freedom reserved and real-time of user-specific signaling resource configuration is taken into account, ensuring validity of the control channel resource configuration. Other hybrid configuration solutions can also be considered, wherein the configuration for the resources, used by the control channel, of the same coreset is divided so that a part employs the semi-static configuration and the remaining employs the dynamic configuration. For example, the frequency-domain (or time-domain) resource employs the semi-static configuration while the time-domain (or frequency-domain) resource employs the dynamic configuration. For specific content of the configuration signaling and way, Embodiment 1 and Embodiment 2 can be referred to. This configuration solution can reduce the signaling overhead of the dynamic configuration.

Embodiment 4

The present embodiment provides a solution of using user-specific signaling to notify control channel resources.

The base station first configures the control channel resources in a dynamic or semi-static or hybrid way, as described in Embodiment 1 or Embodiment 2 or Embodiment 3. Based on this, the base station can indicate the resources for the control channel carrying user-specific control information through user-specific signaling (e.g., carried in MSG 4 for the random access process), thereby reducing the power consumption caused by unnecessary blind detection by the user.

The indicated information can contain information about all or part of the time-domain and frequency-domain resources for the control channel carrying user-specific control information. When information about all of the resources is indicated, the user-specific signaling needs to include information about all the time-domain and frequency-domain resources for the control channel, such as the start positions of the time-domain and frequency-domain, the control channel element (CCE) mapping way, and the aggregation level. In this case, the user can perform no or little blind detection to obtain specific control signaling. When information about part of the control channel resources is indicated, on the basis of the control channel resources configured in the dynamic or semi-static or hybrid way, the base station can notify the control channel resource allocation condition for the user through the user-specific signaling, thereby improving efficiency of blind detection by the user. For example, based on the scheduling condition for the current time slot or the preorder time slot, if the scheduling for the preorder time slot occupies the used resource position of the user-specific search space for a subsequent period of time, the base station can transmit the user-specific signaling to notify the user to postpone detection of the downlink control channel. The specific signaling content can be an explicit notification of the start time and frequency-domain position for transmission of the downlink control channel, or indication of the period during which the user performs blind detection of the control channel or the like.

The device embodiments of the present invention will be described below. The method embodiments and device embodiments of the present invention belong to the same concept and are closely related to each other. For the non-detailed content of the device embodiments, the above method embodiments can be referred to.

Figure 9:
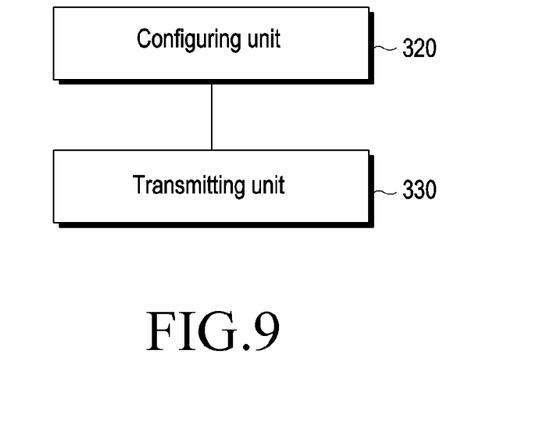
FIG. 9 is a schematic diagram of a transmitting device for transmitting configuration for the resources of control channel according to the present invention.

FIG. 9 is a schematic diagram of a transmitting device for transmitting configuration for the resources of control channel according to the present invention. The transmitting device corresponds to the above-described transmitting method and is applied to the base station.

The transmitting device for transmitting configuration for the resources of control channel comprises: A configuring unit 320 for configuring, for each coreset, control channel resources on a time unit of a scheduling unit (SU); A transmitting unit 330 for transmitting configuration for the resources of control channel on the time unit of the SU.

Herein, the control channel resources belong to the coreset containing a plurality of continuous or discontinuous frequency-domain physical resource blocks available to transmit a downlink control channel.

Herein, the time unit can be a downlink time slot, a downlink subframe, or a downlink mini time slot.

Herein, the configuring unit 320 and the transmitting unit 330 can comprise the following three embodiments.

Specifically, the configuring unit 320 configures control channel resources on a time unit of a current SU in a dynamic way for each coreset; the transmitting unit 330 transmits, on the time unit of the current SU, configuration for the resources of control channel.

Specifically, the configuring unit 320 configures control channel resources on time units of SUs during a configuration period in a semi-static way; the transmitting unit 330 transmits configuration for the resources of control channels on the time units of the SUs during the configuration period through system information, wherein the configuration period contains time units of one or more SUs.

Specifically, the configuring unit 320 configures one part of configuration parameters for control channel resources on time units of SUs during a configuration period in a semi-static way, and configures the other part of configuration parameters for control channel resources on a time unit of a current SU in a dynamic way; the transmitting unit 330 transmits configuration information carrying the part of configuration parameters for the control channel resources on the time units of the SUs during the configuration period through system information, and transmits, on the time unit of the current SU, configuration information carrying the other part of configuration parameters for the control channel resources on the time unit of the SU, wherein the configuration period contains time units of one or more SUs.

Herein, the one part of configuration parameters and the other part of configuration parameters comprise the following three cases:

The one part of configuration parameters configured in a semi-static way are cell-specific frequency-domain resource configuration parameters, and the other part of configuration parameters configured in a dynamic way are cell-specific time-domain resource configuration parameters.

The one part of configuration parameters configured in a semi-static way are cell-specific time-domain resource configuration parameters, and the other part of configuration parameters configured in a dynamic way are cell-specific frequency-domain resource configuration parameters.

The one part of configuration parameters configured in a semi-static way are configuration parameters for the resource of the control channel carrying common control signaling, and the other part of configuration parameters configured in dynamic way are configuration parameters for the resource of the control channel carrying user-specific control signaling.

Wherein, a physical channel, indicating configuration information, on the time unit of the current SU carries a control channel format index, the control channel format index indicating configuration for the resources of control channel on the time unit of the current SU.

Wherein, the system information carries a control channel format index indicating configuration for the resources of control channels on the time units of several SUs during the predetermined period of time.

Wherein, the system information comprises the master information block and/or the system information block.

Wherein, multiple coresets can be configured in the system; specifically, the configuring unit 320 can configure control channel resources on a time unit of an SU individually for each coreset.

Wherein, the transmitting device can further comprise a signaling transmitting unit for transmitting, via collision resolution message MSG4, a user-specific signaling indicating the resource of the control channel carrying the user-specific control signaling.

Herein, the transmitting device can further comprise a determining unit for determining that a part or all of the resources of the coreset are not configured to a control channel, the part or all of the resources being used to schedule traffic channels.

Figure 10:
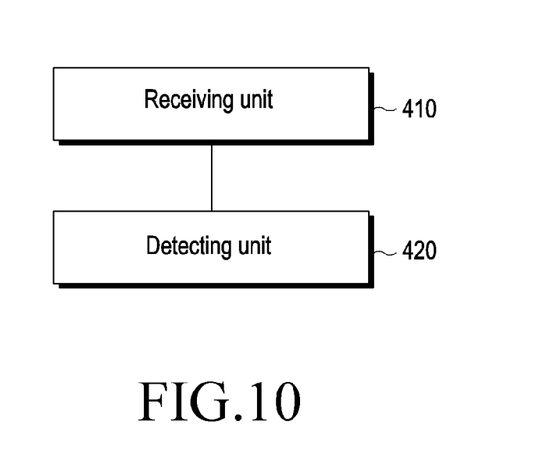
FIG. 10 is a schematic diagram of a detecting device for detecting control channel resources according to the present invention.

FIG. 10 is a schematic diagram of a detecting device for detecting control channel resources according to the present invention. The detecting device corresponds to the above-described detecting method and is applied to the terminal.

The detecting device for detecting control channel resources comprises: a receiving unit 410 for receiving configuration for the resources of control channel on a time unit of an SU; a detecting unit 420 for performing blind detection of a downlink control channel for a user on the time unit of the SU according to the configuration information.

Wherein, the control channel resources belong to a coreset containing a plurality of continuous or discontinuous frequency-domain physical resource blocks available to transmit a downlink control channel.

Wherein, the time unit is a downlink time slot, a downlink subframe, or a downlink mini time slot.

Wherein, the receiving unit 410, which is used for receiving configuration for the resources of control channel on a time unit of an SU, can comprise the following three embodiments.

Specifically, the receiving unit 410 receives the configuration information, for the control channel resources on the time unit of the SU, which is transmitted on the time unit of the current SU.

Specifically, the receiving unit 410 receives the configuration information, for the control channel resources on the time units of the SUs during the configuration period, which is transmitted through system information, wherein the configuration period contains time units of one or more SUs.

Specifically, the receiving unit 410 receives the configuration information, carrying one part of configuration parameters for the control channel resources on the time units of the SUs during the configuration period, which is transmitted through system information, and receives the configuration information, carrying other part of configuration parameters for the control channel resources on the time unit of the SU, which is transmitted on the time unit of the current SU, wherein the configuration period contains time units of one or more SUs.

Wherein, specifically, the detecting unit 420 can deciding, according to the configuration information, whether or not the control channel resources on the time unit of the SU can transmit a downlink control channel for the present user; if yes, perform blind detection of the downlink control channel on the time unit; if no, not perform detection of the downlink control channel on the time unit.

More specifically, the detecting unit 420 can deciding, according to the configuration information, whether or not the control channel resources on the time unit of the SU have control channel mapping; if no, not perform detection of the downlink control channel on the time unit; if yes, find the control channel resources on the time unit according to the configuration information, and deciding, according to the configuration information and self-search space definition, whether or not the control channel resource on the time unit of the SU can transmit a downlink control channel for the present user: if yes, perform blind detection of the downlink control channel on the time unit; if no, not perform detection of the downlink control channel on the time unit.

According to an embodiment, a method of detecting control channel resources comprises the following steps: i) receiving configuration for the resources of control channel on a time unit of a scheduling unit (SU); j) performing blind detection of a downlink control channel for a user on the time unit of the SU according to the configuration information, wherein the control channel resources belong to a coreset containing a plurality of continuous or discontinuous frequency-domain physical resource blocks available to transmit a downlink control channel.

Wherein the step j comprises the following step: m) deciding, according to the configuration information, whether or not the control channel resources on the time unit of the SU can transmit a downlink control channel for the present user; if yes, performing blind detection of the downlink control channel on the time unit; if no, not performing detection of the downlink control channel on the time unit.

Wherein the time unit is a downlink time slot, a downlink subframe, or a downlink mini time slot.

Wherein the step i comprises: receiving configuration for the resources of control channel on a time unit of an SU, which is transmitted on a time unit of a current SU, wherein the configuration information comprises time-domain and/or frequency-domain configuration information.

Wherein the step i comprises: receiving configuration information for control channel resources on time units of SUs during a configuration period, which is transmitted through system information, wherein the configuration period contains time units of one or more SUs.

Wherein the step i comprises: receiving configuration information carrying a part of configuration parameters for control channel resources on time units of SUs during a configuration period, which is transmitted through system information, and receiving configuration information carrying other part of configuration parameters for control channel resources on a time unit of an SU, which is transmitted on a time unit of a current SU, wherein the configuration period contains time units of one or more SUs.

Wherein the step m comprises: deciding, according to the configuration information, whether or not the control channel resource on the time unit of the SU have control channel mapping; if no, not performing detection of the downlink control channel on the time unit; if yes, finding the control channel resources on the time unit according to the configuration information, and deciding, according to the configuration information and self-search space definition, whether or not the control channel resources on the time unit of the SU can transmit a downlink control channel for the present user: if yes, performing blind detection of the downlink control channel on the time unit; if no, not performing detection of the downlink control channel on the time unit.

In summary, on the base station side, control channel resources on a time unit of an SU is configured for each coreset, and configuration for the resources of control channel on the time unit of the SU is transmitted; on the terminal side, configuration for the resources of control channel on a time unit of an SU is received, and blind detection of a downlink control channel for a user is performed on the time unit of the SU according to the configuration information. The present invention configures control channel resources on a time unit, thereby flexibly configuring the control channel resource, and performs blind detection of a downlink control channel for a user on the time unit according to the configuration information, thereby reducing blind detection of a control channel by a terminal, and attaining reduction of power consumption caused by blind detection of the control channel by the terminal and load equalization.

Those skilled in the art may appreciate that all or part of the above steps implementing the present invention may be accomplished by hardware, or by means of a program instructing related hardware that may be stored in a computer readable storage medium, which may comprise a memory, a magnetic disk or an optical disk etc.

Merely some preferred embodiments of the present invention are described above. For those skilled in the art, the embodiments and the applicable scope may be changed on the basis of the concept of the present invention. The disclosure of the description should not be construed to limit the present invention.

The invention claimed is:

1. A method for transmitting configuration information for control channel resources by a base station, the method comprising:
   configuring, for each coreset, control channel resources on a time unit of a scheduling unit (SU); and
   transmitting configuration information for the control channel resources on the time unit of the SU, wherein the control channel resources belong to the coreset containing a plurality of continuous or discontinuous frequency-domain physical resource blocks available to transmit a downlink control channel;
   wherein configuring the control channel resources comprises:
   configuring control channel resources on a time unit of a current SU in a dynamic way, wherein transmitting the configuration information comprises transmitting, on the time unit of the current SU, configuration information for the control channel resources, and
   wherein the configuration information comprises time-domain and/or frequency-domain configuration information.

2. The method of claim 1, wherein the time unit is a downlink time slot, a downlink subframe, or a downlink mini time slot.

3. The method of claim 1, wherein configuring the control channel resources comprises:
   configuring control channel resources on time units of SUs during a configuration period in a semi-static way,
   wherein transmitting the configuration information comprises transmitting configuration information for the control channel resources on the time units of the SUs during the configuration period through system information, and
   wherein the configuration period contains time units of one or more SUs.

4. The method of claim 1, wherein configuring the control channel resources comprises:
   for the coreset, configuring one part of configuration parameters for control channel resources on time units of SUs during a configuration period in a semi-static way, and configuring the other part of the configuration parameters for control channel resources on a time unit of a current SU in a dynamic way,
   wherein transmitting the configuration information comprises transmitting configuration information carrying the one part of the configuration parameters for the control channel resources on the time units of the SUs during the configuration period through system information, and transmitting, on the time unit of the current SU, configuration information carrying the other part of the configuration parameters for the control channel resources on the time unit of the SU, and
   wherein the configuration period contains time units of one or more SUs.

5. The method of claim 4, wherein:
   the part of the configuration parameters configured in the semi-static way are cell-specific frequency-domain resource configuration parameters, and the other part of the configuration parameters configured in the dynamic way are cell-specific time-domain resource configuration parameters; or
   the one part of the configuration parameters configured in the semi-static way are cell-specific time-domain resource configuration parameters, and the other part of the configuration parameters configured in the dynamic way are cell-specific frequency-domain resource configuration parameters; or
   the one part of the configuration parameters configured in the semi-static way are configuration parameters for a resource of a control channel carrying common control signaling, and the other part of the configuration parameters configured in the dynamic way are configuration parameters for a resource of a control channel carrying user-specific control signaling.

6. The method of claim 1, wherein a physical channel on the time unit of the current SU carries a control channel format index, the control channel format index indicating configuration for the control channel resources on the time unit of the current SU.

7. The method of claim 3, wherein the system information carries a control channel format index indicating configuration for the control channel resources on the time units of several SUs during the configuration period.

8. The method of claim 3, wherein the system information comprises the master information block and/or the system information block.

9. The method of claim 1, further comprising:
transmitting, via collision resolution message MSG4, a user-specific signaling indicating a resource of a control channel carrying the user-specific control signaling.

10. A base station for transmitting configuration information for control channel resources, comprising:
a transmitter; and a processor configured to:
configure, for each coreset, control channel resources on a time unit of a scheduling unit (SU); and
control the transmitter to transmit configuration information for the control channel resources on the time unit of the SU, wherein the control channel resources belong to the coreset containing a plurality of continuous or discontinuous frequency-domain physical resource blocks available to transmit a downlink control channel;
wherein the processor is further configured to:
configure control channel resources on a time unit of a current SU in a dynamic way; and
control the transmitter to transmit, on the time unit of the current SU, configuration information for the control channel resources, wherein the configuration information comprises time-domain and/or frequency-domain configuration information.

11. The base station of claim 10, wherein the processor is further configured to:
configure control channel resources on time units of SUs during a configuration period in a semi-static way; and
control the transmitter to transmit configuration information for the control channel resources on the time units of the SUs during the configuration period through system information,
wherein the configuration period contains time units of one or more SUs.

12. The base station of claim 10, wherein the processor is further configured to:
for the coreset, configure one part of configuration parameters for control channel resources on time units of SUs during a configuration period in a semi-static way, and configure the other part of the configuration parameters for control channel resources on a time unit of a current SU in a dynamic way; and
control the transmitter to transmit configuration information carrying the one part of the configuration parameters for the control channel resources on the time units of the SUs during the configuration period through system information, and control the transmitter to transmit, on the time unit of the current SU, configuration information carrying the other part of the configuration parameters for the control channel resources on the time unit of the SU,
wherein the configuration period contains time units of one or more SUs.

13. The base station of claim 12, wherein:
the part of the configuration parameters configured in the semi-static way are cell-specific frequency-domain resource configuration parameters, and the other part of the configuration parameters configured in the dynamic way are cell-specific time-domain resource configuration parameters; or
the one part of the configuration parameters configured in the semi-static way are cell-specific time-domain resource configuration parameters, and the other part of the configuration parameters configured in the dynamic way are cell-specific frequency-domain resource configuration parameters; or
the one part of the configuration parameters configured in the semi-static way are configuration parameters for a resource of a control channel carrying common control signaling, and the other part of the configuration parameters configured in the dynamic way are configuration parameters for a resource of a control channel carrying user-specific control signaling.

14. A terminal for detecting control channel resources, comprising:
a receiver; and
a processor configured to:
receive, via the receiver, configuration information for control channel resources on a time unit of a scheduling unit (SU); and
perform blind detection of a downlink control channel for a user on the time unit of the SU according to the configuration information,
wherein the control channel resources belong to a coreset containing a plurality of continuous or discontinuous frequency-domain physical resource blocks available to transmit a downlink control channel;
wherein the processor is further configured to:
configure control channel resources on a time unit of a current SU in a dynamic way; and
control the receiver to receive, on the time unit of the current SU, configuration information for the control channel resources, wherein the configuration information comprises time-domain and/or frequency-domain configuration information.

15. The terminal of claim 14, wherein the processor is further configured to:
configure control channel resources on time units of SUs during a configuration period in a semi-static way; and
control the receiver to receive configuration information for the control channel resources on the time units of the SUs during the configuration period through system information,
wherein the configuration period contains time units of one or more SUs.

16. The terminal of claim 15, wherein the processor is further configured to:
for the coreset, configure one part of configuration parameters for control channel resources on time units of SUs during a configuration period in a semi-static way, and configure the other part of the configuration parameters for control channel resources on a time unit of a current SU in a dynamic way; and
control the receiver to receive configuration information carrying the one part of the configuration parameters for the control channel resources on the time units of the SUs during the configuration period through system information, and control the receiver to receive, on the time unit of the current SU, configuration information carrying the other part of the configuration parameters for the control channel resources on the time unit of the SU,
wherein the configuration period contains time units of one or more SUs.

17. The terminal of claim 16, wherein:
the part of the configuration parameters configured in the semi-static way are cell-specific frequency-domain resource configuration parameters, and the other part of the configuration parameters configured in the dynamic way are cell-specific time-domain resource configuration parameters; or the one part of the configuration parameters configured in the semi-static way are cell-specific time-domain resource configuration parameters, and the other part of the configuration parameters configured in the dynamic way are cell-specific frequency-domain resource configuration parameters; or the one part of the configuration parameters configured in the semi-static way are configuration parameters for a resource of a control channel carrying common control signaling, and the other part of the configuration parameters configured in the dynamic way are configuration parameters for a resource of a control channel carrying user-specific control signaling.

\* \* \* \* \*